United States Patent
Hayes et al.

(10) Patent No.: US 10,997,522 B1
(45) Date of Patent: May 4, 2021

(54) SUPPRESSING/TRANSFORMING LEAKAGE ERRORS IN HYPERFINE QUBITS

(71) Applicant: Honeywell International Inc., Morris Plains, NJ (US)

(72) Inventors: David Hayes, Broomfield, CO (US); Russell Stutz, Broomfield, CO (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/709,290

(22) Filed: Dec. 10, 2019

(51) Int. Cl.
*G06N 10/00* (2019.01)

(52) U.S. Cl.
CPC .................... *G06N 10/00* (2019.01)

(58) Field of Classification Search
CPC .............. G06N 10/00; H01L 49/006
See application file for complete search history.

(56) References Cited

U.S. PATENT DOCUMENTS

| | | | | |
|---|---|---|---|---|
| 6,643,311 B2* | 11/2003 | Krupke | ..................... | H01S 3/22 372/56 |
| 2014/0264285 A1* | 9/2014 | Chow | ................... | H01L 49/006 257/31 |
| 2018/0314967 A1* | 11/2018 | Barends | ..................... | F41J 1/10 |
| 2020/0082291 A1* | 3/2020 | Debnath | ................. | G02F 1/116 |
| 2020/0364602 A1* | 11/2020 | Niu | ........................ | G06N 10/00 |

OTHER PUBLICATIONS

Benhelm, Jan, Precision Spectroscopy and Quantum Information processing with Trapped Calcium Ions, 2008, [online] [retrieved Mar. 9, 2020] retrieved from the Internet URL: http://quantumoptics.at, 172 pages.

Berkeland, et al., Laser-Cooled Mercury Ion Frequency Standard, 1997, [online] [retrieved on Mar. 9, 2020], from the Internet URL: https://www.google.com/search?q=Laser-Cooled+Mercury+Ion+Frequency+Standard, 4 pages.

Fisk et al., Accurate measurement of the 12.6GHz "Clock" transition in trapped 171Yb+, 1997, [online] [retrieved on Mar. 9, 2020], retrieved from the Internet URL: https://www.google.com/search?q=Fisk%2BAccurate+measurement+of+the+12.6GHz+%22Clock%22+transition+in+trapped, 11 pages.

(Continued)

Primary Examiner — Patrick C Chen
(74) Attorney, Agent, or Firm — Alston & Bird LLP

(57) ABSTRACT

A quantum computer comprises an apparatus having atomic objects therein; a first manipulation source configured to provide a first manipulation signal; a second manipulation source configured to provide a second manipulation signal; and a controller. The controller is configured to cause the first manipulation source to provide the first manipulation signal to a region of the apparatus; and cause the second manipulation source to provide the second manipulation signal to the region. The first manipulation signal is tuned to excite atomic objects within the region from a leaked state outside of the qubit space to an intermediary manifold and to suppress excitation of atomic objects that are in the qubit space. The second manipulation signal is tuned to excite atomic objects from the intermediary manifold to a decay manifold from which there is a non-zero probability that an atomic object will decay into the qubit space.

20 Claims, 11 Drawing Sheets

(56) References Cited

OTHER PUBLICATIONS

Figure 1:
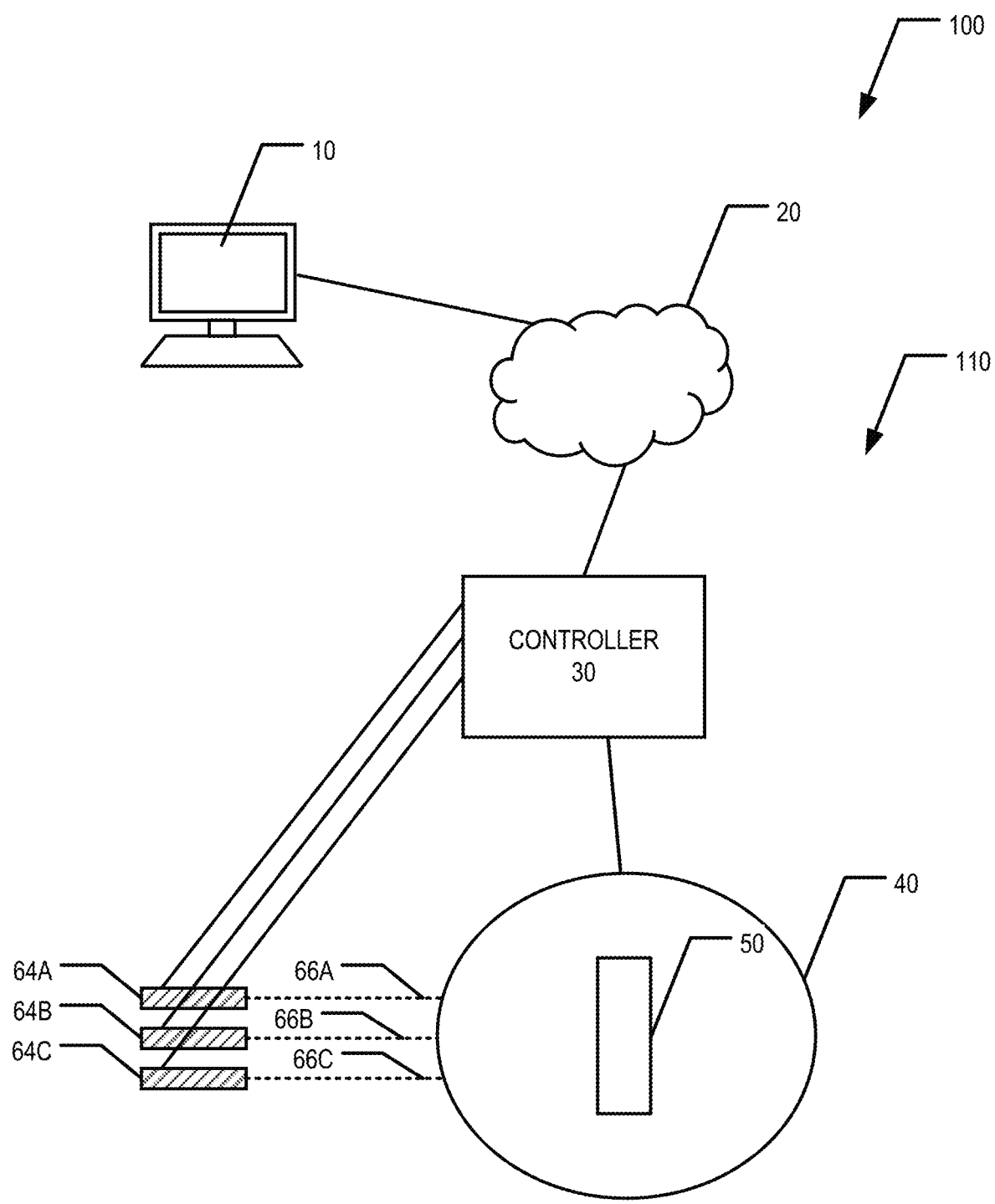

Gaebler et al., High-Fidelity Universal Gate Set for 9Be+ Ion Qubits, 2016, [online] [retrieved Mar. 9, 2020] retrieved from the internet URL: https://arxiv.org/abs/1604.00032, 12 pages.

Ghosh, et al., Understanding the effects of leakage in superconducting quantum-error-detection circuits, 2013, [online] [retrieved on Mar. 9, 2020], from the Internet URL: https://arxiv.org/abs/1306.0925, 8 pages.

Hucul et al., Spectroscopy of a synthetic trapped ion qubit, 2017, [online] retrieved Mar. 9, 2020] retrieved from the Internet URL: https://arxiv.org/abs/1705.09736, 5 pages.

Kim et al., Entanglement and Tunable Spin-Spin Couplings between Trapped Ions Using Multiple Transverse Modes, 2009, [online] [retrieved on Mar. 9, 2020], retrieved from the Internet URL: https://arxiv.org/abs/0905.0225, 4 pages.

Martin et al., Advanced Ion Trap Development and Ultrafast Laser-Ion Interactions, 2006, [online] [retrieved Mar. 9, 2020] retrieved from the Internet URL: https://scholar.google.com/scholar?q=Madsen,+Martin.+Advanced+Ion+Trap+Development+and+Ultrafast+Laser-Ion+Interactions, 221 pages.

Miller, Interactions with Intense Laser Pulses, 2003, [online] [retrieved Mar. 9, 2020] retrieved from the Internet URL: https://www.google.com/search?q=An+Apparatus+for+the+Observation+of+Trapped+Cadmium+Ion+Interactions+with+Intense+Laser+Pulses&rlz, 71 pages.

Olmschenk et al., Manipulation and Detection of a trapped Yb Hyperfine Qubit, 2007, [online] [retrieved from the internet Mar. 9, 2020] URL: https://arxiv.org/abs/0708.0657, 10 pages.

Ozeri, et al., Errors in trapped-ion quantum gates due to spontaneous photon scattering, 2007, [online] [retrieved on Mar. 9, 2020], from the Internet URL: https://arxiv.org/abs/quant-ph/0611048, 15 pages.

Rosen, et al., Double Stem-Gerlach Experiment and Related Collision Phenomena,1932, [online] [retrieved on Mar. 10, 2020] retrieved from the Internet URL: https://journals.aps.org/pr/abstract/10.1103/PhysRev.40.502, 6 pages.

Safronova et al., Excitation energies, E1, M1 & E2 transition rates and lifetimes in Ca+, Sr+, Cd+, Ba+ and Hg+, 2006, [online] [retrieved Mar. 9, 2020] retrieved from the Internet URL: https://www.google.com/search?q=Excitation+energies%2C+E1%2C+M1+%26+E2+transition+rates+and+lifetimes, 8 pages.

Webster, Raman Sideband Cooling and Coherent Manipulation of Trapped Ions, 2005, [online] [retrieved Mar. 9, 2020] retrieved from the Internet URL: https://scholar.google.com/scholar?q=.+Webster,+Simon.+Raman+Sideband+Cooling+and+Coherent+Manipulation+of+Trapped+Ions, 117 pages.

* cited by examiner

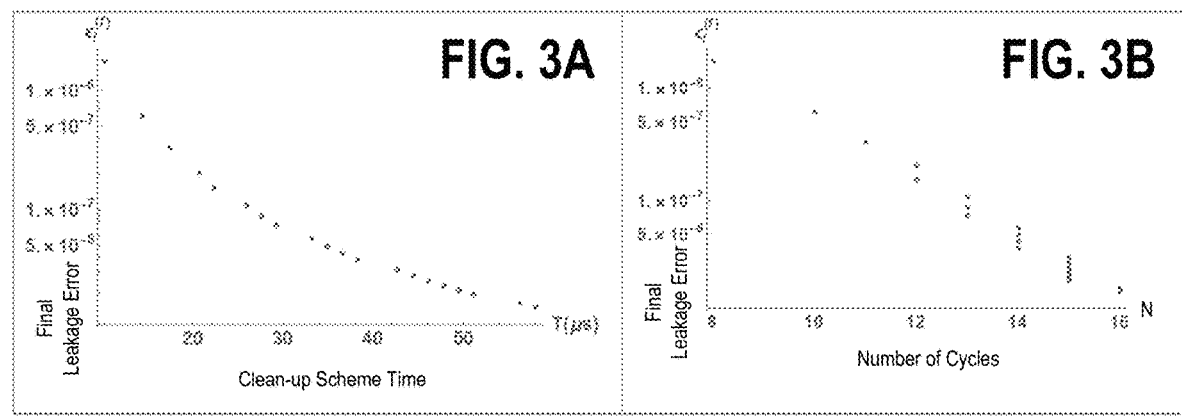

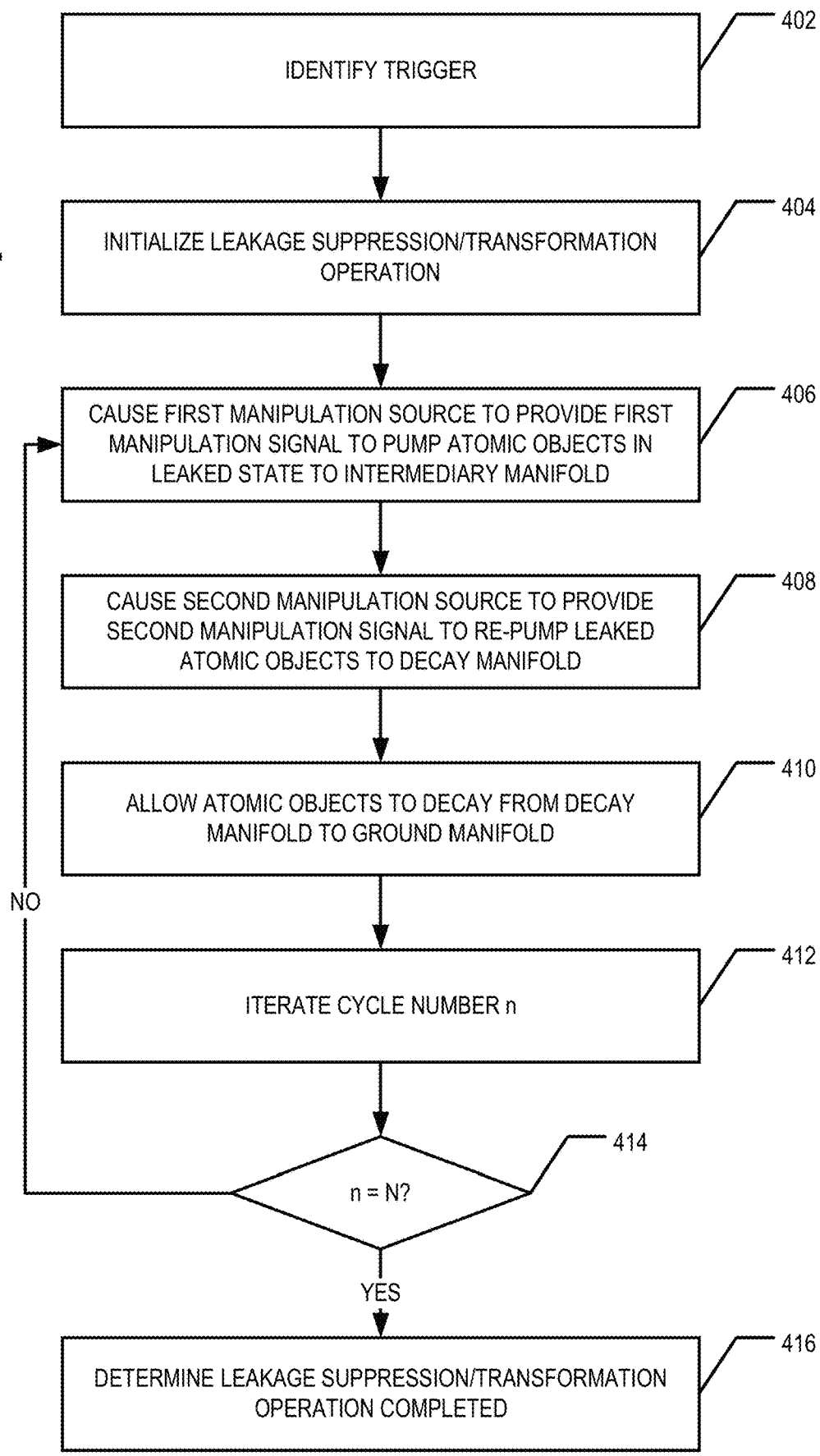

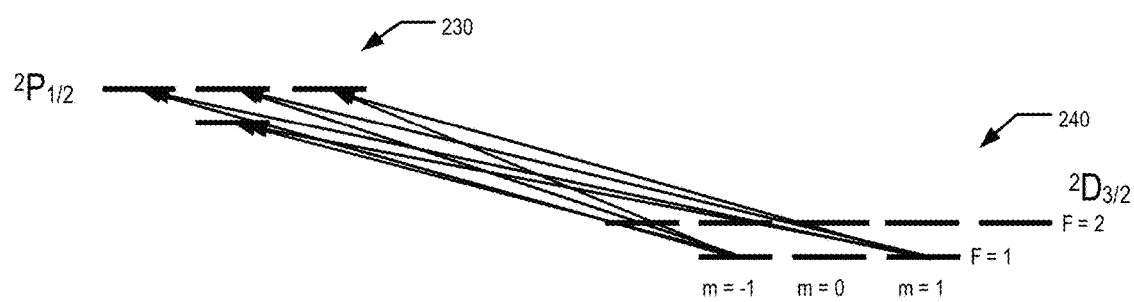
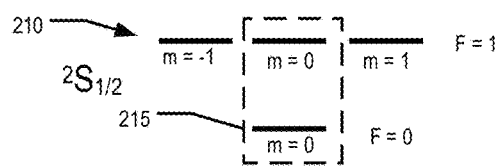
FIG. 5B

US 10,997,522 B1

SUPPRESSING/TRANSFORMING LEAKAGE ERRORS IN HYPERFINE QUBITS

TECHNICAL FIELD

Various embodiments relate to suppressing/transforming leakage errors in a trapped atomic object quantum computer. For example, various embodiments relate to suppressing/transforming leakage errors in hyperfine qubits.

BACKGROUND

In trapped atomic object quantum computers, trapped atomic objects (e.g., atoms, ions, and/or the like) are used as qubits of the quantum computer. Qubits, similar to classical bits, may be in one of two states (e.g., 0 or 1). However, atomic objects within a trap may be in more than two states. When an atomic object leaves the defined two state qubit space, the atomic object is said to have been leaked. This leakage leads to leakage errors. Through applied effort, ingenuity, and innovation many deficiencies of such systems have been solved by developing solutions that are structured in accordance with the embodiments of the present invention, many examples of which are described in detail herein.

BRIEF SUMMARY OF EXAMPLE EMBODIMENTS

Example embodiments provide quantum computers, systems, apparatuses, and/or the like and corresponding methods for performing a leakage suppression/transformation operation. In various embodiments, the leakage suppression/transformation operation may be performed to reduce leakage errors experienced by a quantum computer.

According to one aspect, a quantum computer is provided. In an example embodiment, the quantum computer comprises an apparatus having one or more atomic objects therein; a first manipulation source configured to provide a first manipulation signal; a second manipulation source configured to provide a second manipulation signal; and a controller. The controller is configured to cause the first manipulation source to provide the first manipulation signal to a particular region of the apparatus; and cause the second manipulation source to provide the second manipulation signal to the particular region of the apparatus. The first manipulation signal is tuned to excite atomic objects within the particular region of the apparatus that have leaked out of a qubit space from a leaked state to an intermediary manifold and to suppress excitation of atomic objects within the particular region of the apparatus that are in the qubit space. The second manipulation signal is tuned to excite atomic objects from the intermediary manifold to a decay manifold.

In an example embodiment, the qubit space is defined based on hyperfine splitting of a ground state manifold of the one or more atomic objects. In an example embodiment, controller is configured to cause the first manipulation source to provide the first manipulation signal and cause the second manipulation source to provide the second manipulation signal, consecutively, a plurality of times. In an example embodiment, after the second manipulation source provides the second manipulation signal, the controller causes the first manipulation source to provide the first manipulation signal after a decay time. In an example embodiment, the decay time is determined based on the average time for an atomic object to decay from the decay manifold to a ground state manifold, the qubit space being defined within the ground state manifold. In an example embodiment, (a) the one or more atomic objects have spin ½ nuclei, (b) the intermediary manifold is a $^2D_{3/2}$ manifold, and (c) the decay manifold is one of a $^2P_{1/2}$ manifold or a $^3[3/2]_{1/2}$ manifold. In an example embodiment, the first manipulation signal is tuned to excite a quadrupole transition from the leaked state to the intermediary manifold. In an example embodiment, the wave vector and the polarization of the first manipulation signal are substantially orthogonal to the magnetic field in the particular region of the apparatus. In an example embodiment, the first manipulation signal is shaped to suppress transitions out of the qubit space. In an example embodiment, the first manipulation signal is shaped to be a hyperbolic secant-shaped pulse. In an example embodiment, the pulse time of the first manipulation signal is in a range of approximately 0.8 µs to 30 µs.

According to another aspect, a method for performing a leakage suppression/transformation operation for suppressing/transforming leakage errors in a quantum computer is provided. In an example embodiment, the method comprises causing, by a controller of the quantum computer, a first manipulation source to provide a first manipulation signal to a particular region of an apparatus of the quantum computer having one or more atomic objects therein, wherein the first manipulation signal is tuned to excite atomic objects within the particular region of the apparatus that have leaked out of a qubit space from a leaked state to an intermediary manifold and to suppress excitation of atomic objects within the particular region of the apparatus that are in the qubit space; and causing, by the controller, a second manipulation source to provide a second manipulation signal to the particular region of the apparatus, wherein the second manipulation signal is tuned to excite atomic objects from the intermediary manifold to a decay manifold.

In an example embodiment, the qubit space is defined based on the hyperfine splitting of a ground state manifold of the one or more atomic objects. In an example embodiment, a controller is configured to cause the first manipulation source to provide the first manipulation signal and cause the second manipulation source to provide the second manipulation signal, consecutively, a plurality of times. In an example embodiment, after the second manipulation source provides the second manipulation signal, the controller causes the first manipulation source to provide the first manipulation signal after a decay time. In an example embodiment, the decay time is determined based on the average time for an atomic object to decay from the decay manifold to a ground state manifold, the qubit space being defined within the ground state manifold. In an example embodiment, (a) the one or more atomic objects have spin ½ nuclei, (b) the intermediary manifold is a $^2D_{3/2}$ manifold, and (c) the decay manifold is one of a $^2P_{1/2}$ manifold or a $^3[3/2]_{1/2}$ manifold. In an example embodiment, the first manipulation signal is tuned to excite a quadrupole transition from the leaked state to the intermediary manifold. In an example embodiment, the wave vector and the polarization of the first manipulation signal are substantially orthogonal to the magnetic field in the particular region of the apparatus. In an example embodiment, the first manipulation signal is shaped to suppress transitions out of the qubit space. In an example embodiment, the first manipulation signal is shaped to be a hyperbolic secant-shaped pulse. In an example embodiment, the pulse time of the first manipulation signal is in a range of approximately 0.8 µs to 30 µs.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides block diagram of an example atomic object quantum computer, in accordance with an example embodiment.

Figure 2:
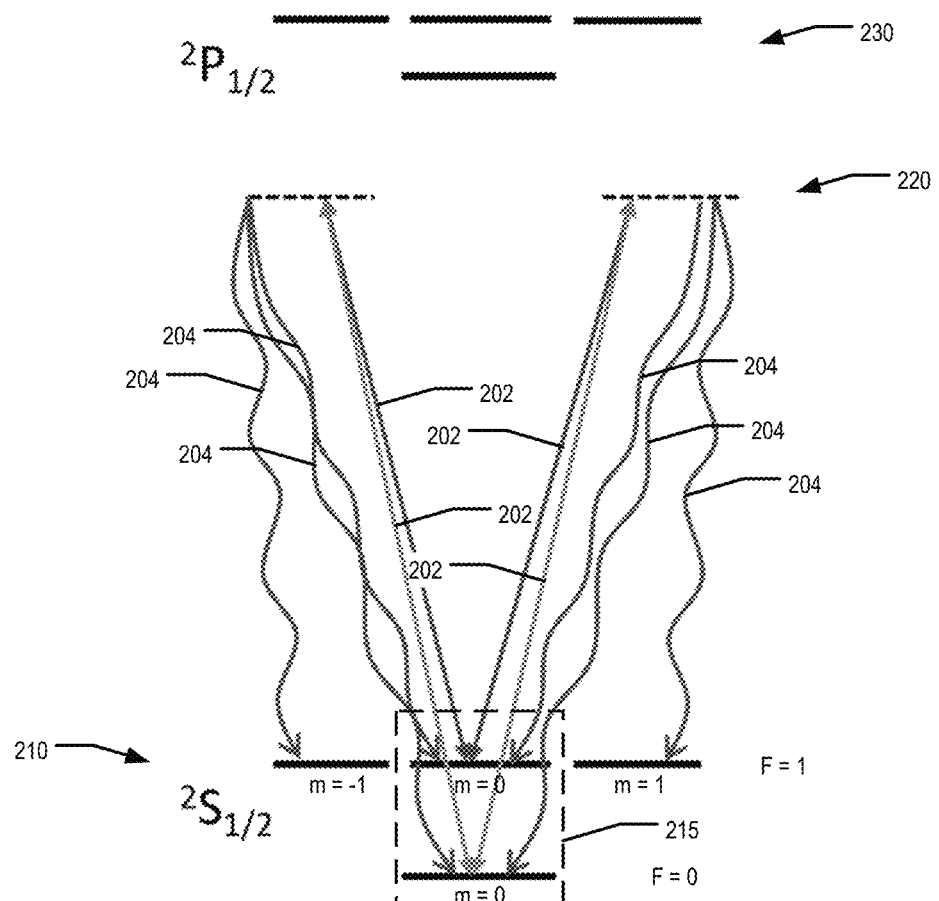

FIG. 2 provides a schematic diagram illustrating an example of how leakage errors in atomic objects may occur, in accordance with an example embodiment.

FIG. 3A provides a plot showing simulation results of the final leakage error as a function of the total time used to perform the leakage suppression/transformation operation T, in accordance with an example embodiment.

FIG. 3B provides a plot showing simulation results of the final leaked error as a function of the number of cycles N performed during the leakage suppression/transformation operation, in accordance with an example embodiment.

Figure 3C:
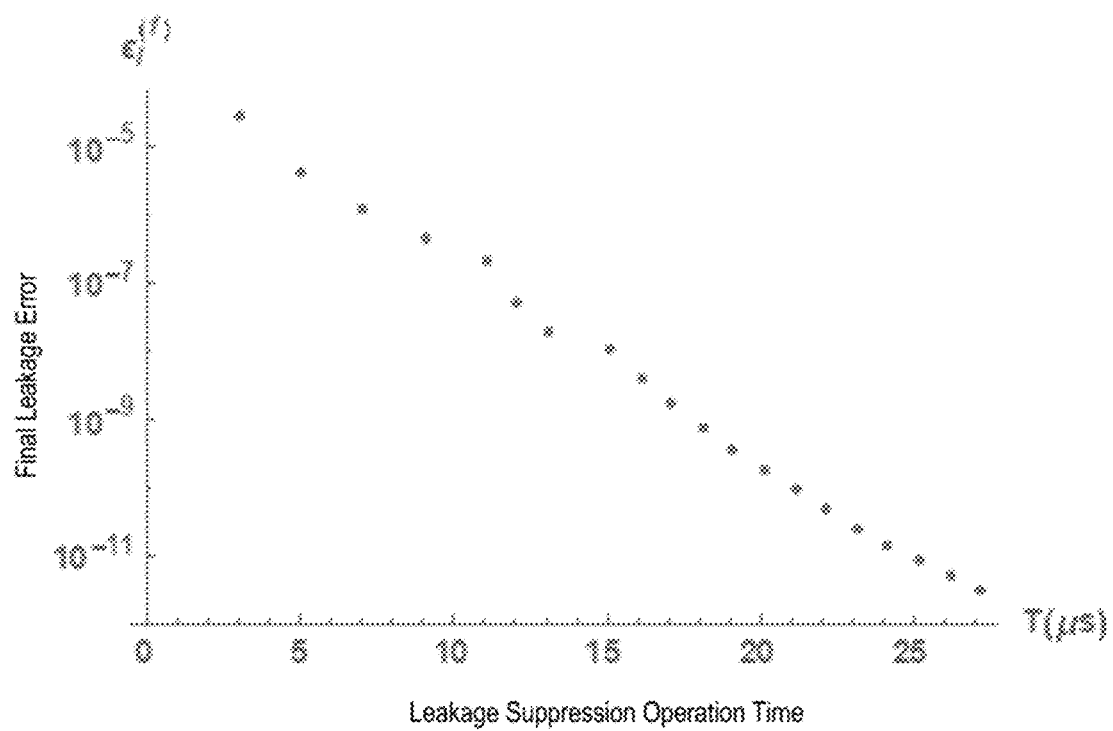

FIG. 3C provides a plot showing simulation results of the final leakage error as a function of the total time used to perform the leakage suppression/transformation operation T when a hyperbolic secant shaped first manipulation signal is used, in accordance with an example embodiment.

FIG. 4 provides a flowchart illustrating various processes, procedures, and/or operations of a leakage suppression/ transformation method, in accordance with an example embodiment.

Figure 5A:
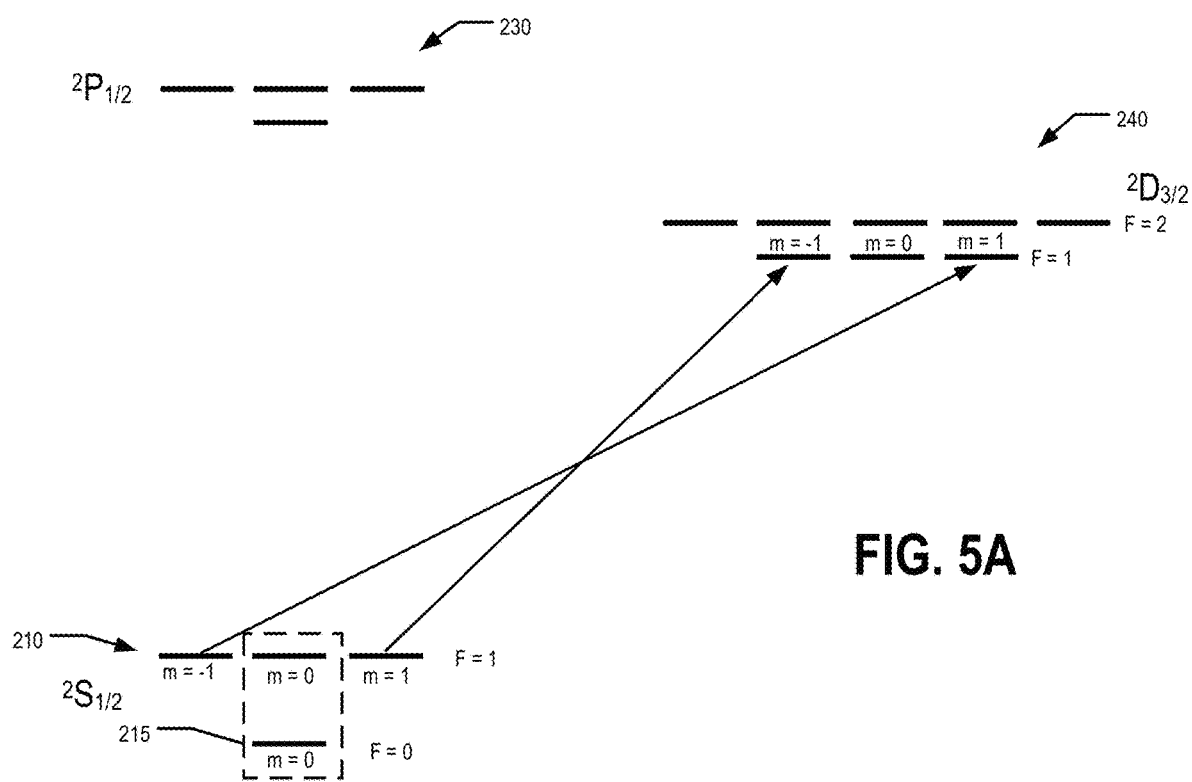
Figure 5C:
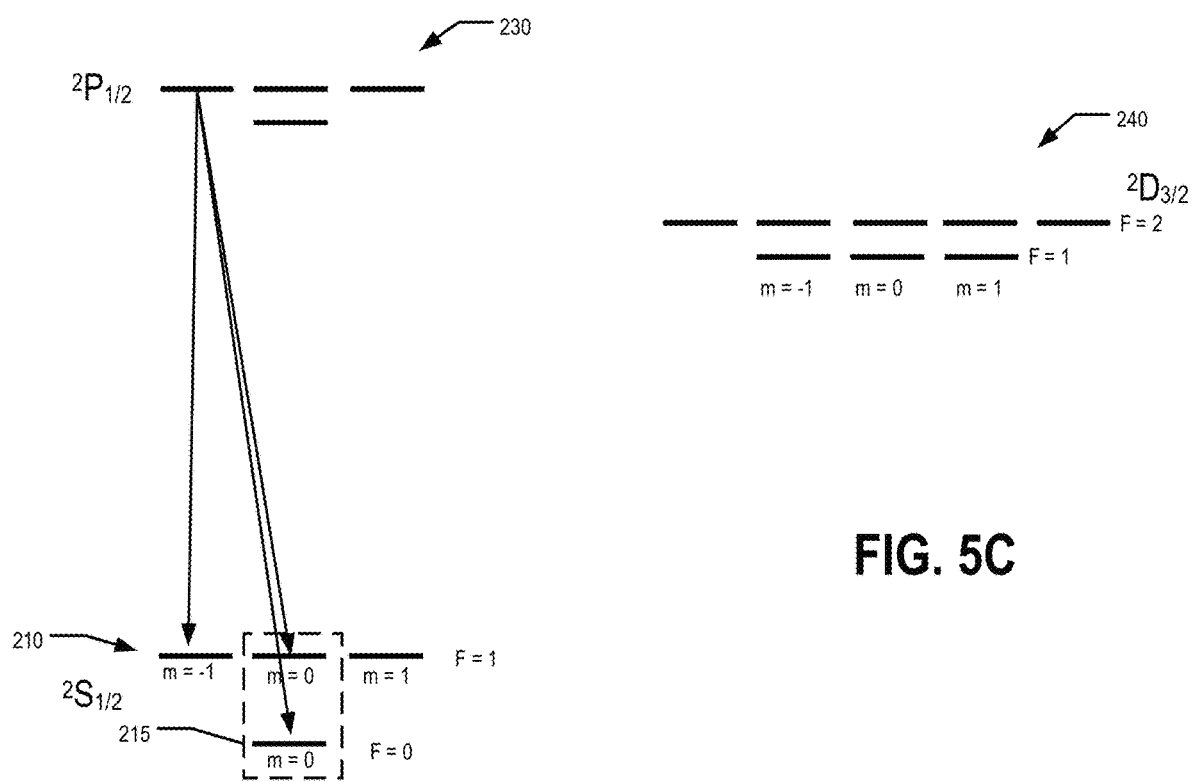

FIGS. 5A, 5B, and 5C each provide a schematic diagram of a step of performing a leakage suppression/transformation method, in accordance with an example embodiment.

Figure 5D:
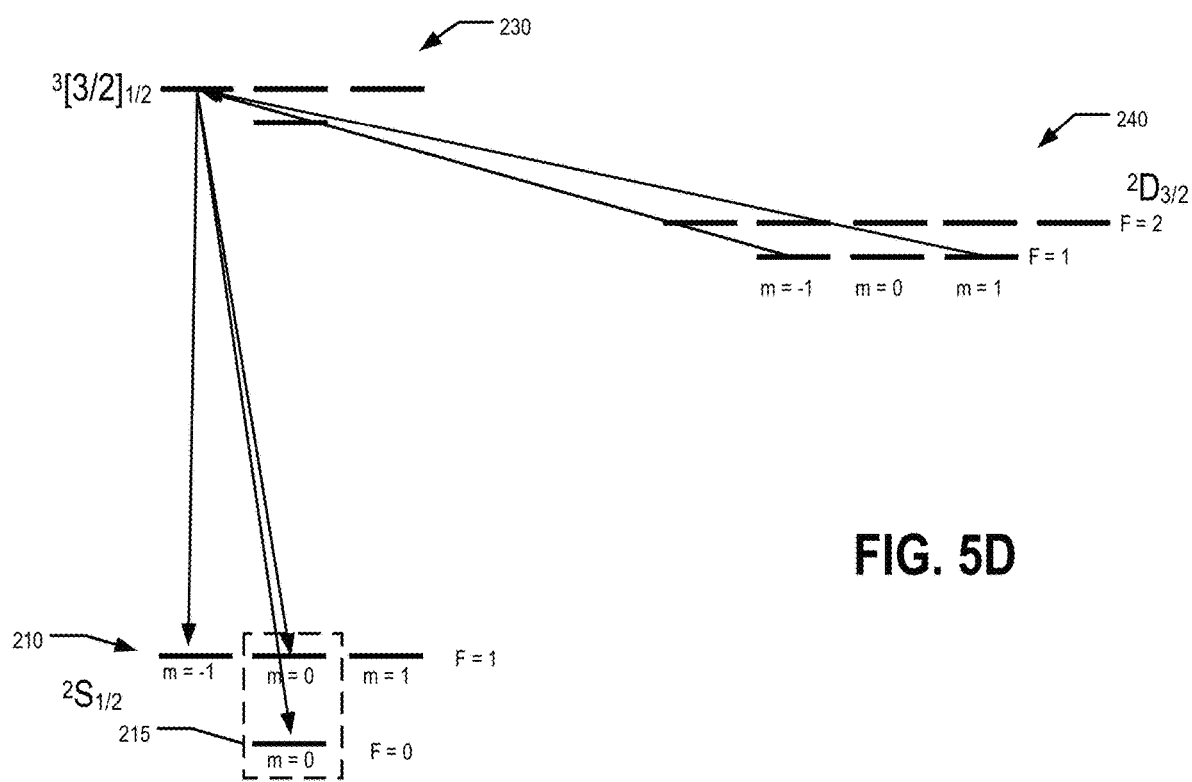

FIG. 5D provides a schematic diagram similar to FIGS. 5B and 5C, where the decay manifold is the $^3[3/2]_{1/2}$ manifold, in accordance with an example embodiment.

Figure 6:
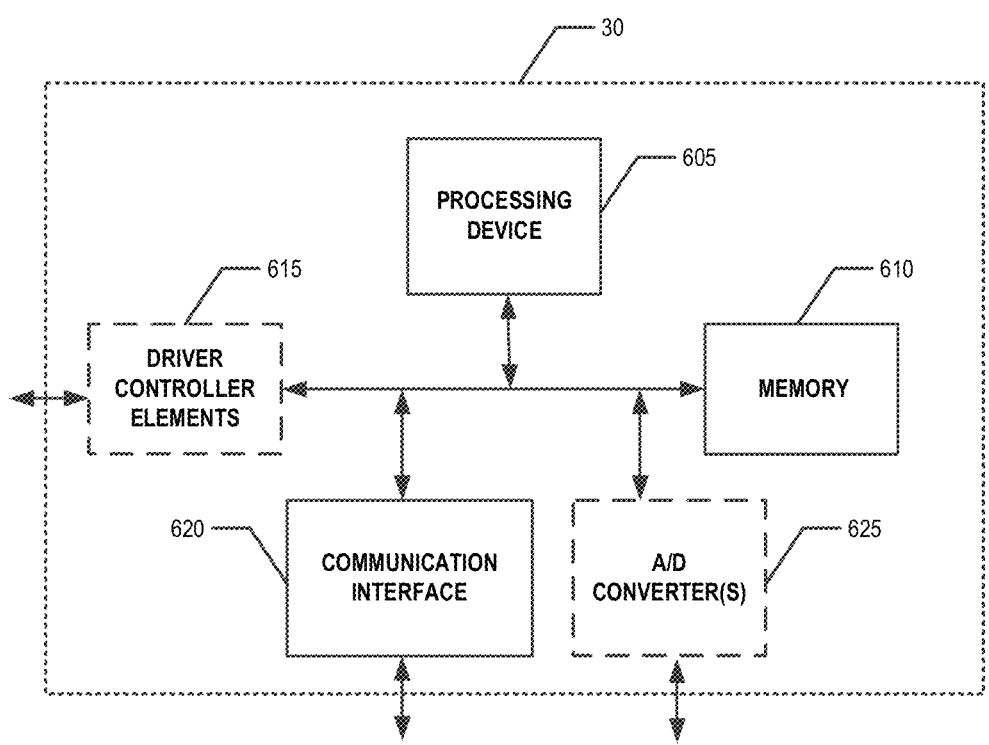

FIG. 6 provides a schematic diagram of an example controller of a quantum computer comprising an apparatus having atomic objects therein, in accordance with an example embodiment.

Figure 7:
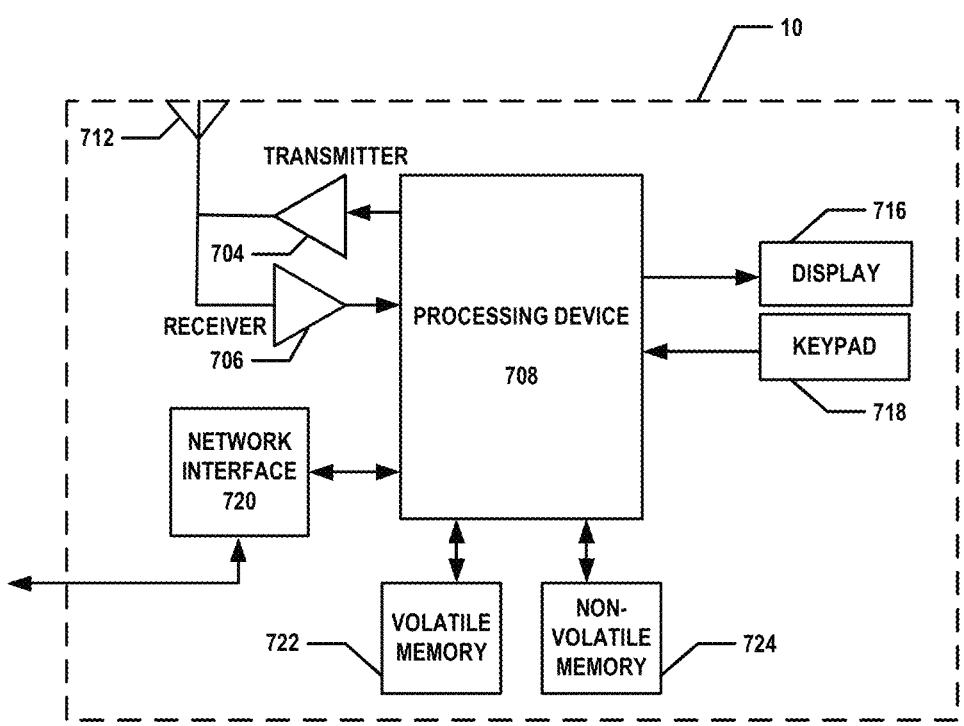

FIG. 7 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

A qubit is a quantum bit, the counterpart in quantum computing to the binary digit or bit of classical computing. Just as a bit is the basic unit of information in a classical computer, a qubit is the basic unit of information in a quantum computer. A qubit is a two-state (or two-level) quantum-mechanical system, one of the simplest quantum systems displaying the peculiarity of quantum mechanics. Examples of two-state quantum-mechanical systems that have been used as qubits include: the spin of the electron or atomic nucleus in which the two levels can be taken as spin up and spin down and the polarization of a single photon in which the two states can be taken to be the vertical polarization and the horizontal polarization.

In various embodiments, hyperfine splitting is the splitting of energy levels of the atomic object due to interaction between the state of the nucleus and the state of the electron clouds of the atomic object. In various embodiments, an atomic object may be an atom or an ion. In an example embodiment, an atomic object is one or more atoms or ions of one or more elements and/or species. As used herein, the term manifold refers to the plurality of states corresponding to a particular primary quantum number and angular momentum quantum number.

In various quantum-mechanical systems, a two-state qubit space may be defined. For example, a two-state qubit space may be defined as two hyperfine levels of an atomic object. For example, in an atomic object with a spin ½ nucleus, such as 111Cd+, 133Ba+, 171Yb+, 199Hg+, and/or the like, two hyperfine levels may be defined as a two-state qubit space 215, as shown in FIG. 2. For example, the two-states may correspond to whether F=0, $^2S_{1/2}$ state (e.g., the |0> state) is occupied or whether the F=1, m=0, $^2S_{1/2}$ state (e.g., the |1> state) is occupied, where F indicates the total angular momentum of the atomic object (e.g., F is the sum of the nuclear spin and the electron angular momentums of the atomic object). However, the m=0, $^2S_{1/2}$ states are not the only states of the ground level $^2S_{1/2}$ manifold. Thus, it is possible that an atomic object may be leaked from the qubit space 215. For example, rather than being in the F=0, $^2S_{1/2}$ state (e.g., the |0> state) or the F=1, m=0, $^2S_{1/2}$ state (e.g., the |1> state), the atomic object may be in the F=1, m=−1 or 1, $^2S_{1/2}$ state. As used herein the quantum number m refers to the z-component of the total angular momentum, for example. Various embodiments provide techniques and corresponding apparatus and/or systems for suppressing/transforming leakage errors caused by these leaked atomic objects. For example, various embodiments provide techniques and corresponding apparatus and/or systems for returning these leaked atomic objects back to the qubit space 215. In various embodiments, leakage errors are transformed into standard quantum computing errors (e.g., accumulation of unwanted Stark shift and/or the like). These standard errors may be corrected and/or adjusted for via quantum error correction and/or the like. For example, standard errors that do not move qubits outside the qubit space may be corrected by using quantum error correction codes and the overall error level of the quantum computer may be reduced. Thus, various embodiments provide an improvement to quantum computing technology, especially quantum computing technology using hyperfine qubits and/or using nuclear-spin 2 atomic objects as qubits, by reducing leakage errors and/or transforming leakage errors experienced by computations performed by the quantum computer to reduce the overall error rate of the quantum computer.

Exemplary Quantum Computer System

FIG. 1 provides a block diagram of an example quantum computer system 100. In various embodiments, the quantum computer system 100 comprises a computing entity 10 and a quantum computer 110. In various embodiments, the quantum computer 110 comprises a controller 30, a cryogenic and/or vacuum chamber 40 enclosing an apparatus 50 having atomic objects therein, and one or more manipulation sources 64 (e.g., 64A, 64B, 64C). In an example embodiment, the one or more manipulation sources 64 may comprise one or more lasers (e.g., optical lasers, microwave sources and/or masers, and/or the like) or another manipulation source. In various embodiments, the one or more manipulation sources 64 are configured to manipulate and/or cause a controlled quantum state evolution of one or more atomic objects within the apparatus 50. In an example embodiment, an atomic object is one or more atoms or ions of one or more elements and/or species. In an example embodiment, the apparatus 50 is an atomic object trap, ion trap, and/or other apparatus configured to confine, contain, trap, and/or otherwise have atomic objects therein. For example, the apparatus 50 may be a surface ion trap, in an example embodiment. In an example embodiment, wherein the one or more manipulation sources 64 comprise one or more lasers, the lasers may provide one or more laser beams to the apparatus 50 within the cryogenic and/or vacuum chamber 40. In various embodiments, the manipulation sources 64 may be used to perform gate operations, cooling operations, leakage suppression/transformation operations, and/or the like. In an example embodiment, the one or more manipulation sources 64 each provide a laser beam and/or the like to the apparatus 50 via a corresponding beam path 66 (e.g., 66A, 66B, 66C). In various embodiments, at least one beam path 66 comprises a modulator configured to modulate the manipulation beam being provided to the apparatus 50 via the beam path 66. In various embodiments, the manipulation sources 64, modulator, and/or other components of the quantum computer 110 are controlled by the controller 30.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control electrical signal sources and/or drivers controlling the apparatus 50 and/or transport of atomic objects within the apparatus 50, a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the apparatus 50. In various embodiments, the atomic objects trapped within the apparatus 50 are used as qubits of the quantum computer 110.

Overview of Leakage Suppression/Transformation Operation

In various embodiments, the atomic objects contained, trapped, and/or otherwise within the apparatus 50 have spin ½ nuclei. For example, the atomic objects may be 111Cd+, 133Ba+, 171Yb+, 199Hg+, and/or other nuclear-spin ½ atomic objects and/or other atomic objects that exhibit states that are appropriate for defining a qubit space. FIG. 2 provides a schematic diagram of the $S_{1/2}$ and $P_{1/2}$ manifolds 210, 230 of an example nuclear-spin ½ atomic object, including the hyperfine structure. The qubit space 215 includes the m=0 states of the ground state or $S_{1/2}$ manifold 210, which are first-order insensitive to small magnetic fields, naturally giving the states relatively long coherence times. In various embodiments, single and/or two-qubit operations may be performed using stimulated Raman transitions 202 which couple the two qubit states to one or more intermediate state(s) 230 to perform the operation (e.g., possibly via virtual states 220). For example, single and/or two-qubit operations may be performed using the stimulated Raman transitions 202 that couple the two states of the qubit space 215 via a two-photon transition mediated through the $P_{1/2}$ and $P_{3/2}$ states. One source of error in these manipulations is due to the finite lifetime of the excited states which can lead to spontaneous emission events 204 as depicted in FIG. 2. For example, a spontaneous emission event 204 is an event where an atomic object de-excites from an excited state without the application of an external stimulation signal (e.g., a manipulation signal and/or the like). These spontaneous emission events 204 can result in leakage of the quantum information outside the qubit space 215. For example, each spontaneous emission event 204 shown has an equal probability of occurring. Thus, on average, one of every three spontaneous emission events will result in an atomic object being in one of the F=1, m=−1 or 1, $^2S_{1/2}$ states. For example, one of every three spontaneous emission events 204 results in an atomic object being leaked outside of the qubit space 215.

Various embodiments provide a leakage suppression/transformation operation that uses a re-pumping scheme to suppress leakage errors and to return leaked atomic objects back to the qubits space 215. For example, a leakage suppression/transformation operation may transform leakage errors into standard quantum computing errors that may be addressed, for example, via quantum error correction. In various embodiments, a re-pumping scheme may be used to return the leaked atomic objects back into the qubit space 215. For example, the controller 30 may cause a first manipulation source 64A to provide a first manipulation beam, plus, and/or set of pulses (e.g., laser beam, pulse, and/or set of pulses; referred to herein as the first manipulation signal) that is incident on one or more atomic objects within the apparatus 50 and that addresses any leaked atomic object(s). In an example embodiment, the first manipulation source 64A is a laser. The first manipulation signal may be configured to address the leaked atomic objects (e.g., atomic objects in the leaked states of F=1, m=−1 or 1, $^2S_{1/2}$ states) while not addressing atomic objects in the qubit space (e.g., atomic objects in the F=0 or 1, m=0, $^2S_{1/2}$ states). For example, the first manipulation signal may be configured to excite a quadrupole transition from the leaked states. For example, the first manipulation signal may be tuned to be resonant with transitions from the leaked states (e.g., F=1, m=−1 or 1, $^2S_{1/2}$ states) to an intermediary manifold 240. In various embodiments, the first manipulation signal may be tuned to be off-resonance for transitions originating from within the qubit space 215 (e.g., F=0 or 1, m=0, $^2S_{1/2}$ states). For example, leaked atomic objects may be transitioned from the leaked states to states of an intermediary manifold 240 (e.g., possibly using a quadrupole transition) via the first manipulation signal and atomic objects within the qubit space may be generally unaffected (and/or minimally affected) by the first manipulation signal.

The controller 30 may then cause a second manipulation source 64B to provide a second manipulation beam, pulse, and/or set of pulses (e.g., laser beam, pulse, and/or set of pulses; referred to as the second manipulation signal herein) that is incident on one or more atomic objects within the apparatus 50 and address the atomic objects in the intermediary state. In an example embodiment, the second manipulation source 64B is a laser. In various embodiments, the second manipulation signal may cause atomic objects in the intermediary manifold 240 to transition to one or more states in a decay manifold 230. In various embodiments, the decay manifold 230 is a manifold that the states therein quickly decay to the $S_{1/2}$ manifold with a significant percentage of the atomic objects decaying from the one or more states in the decay manifold 230 to the ground and/or $S_{1/2}$ manifold 210 expecting to decay into the qubit space 215. For example, there is a non-zero probability the atomic object will decay from the decay manifold 230 into the qubit space 215. In various embodiments, a significant percentage may be a percentage of at least approximately 15%, 20%, 25%, 30%, 33%, 40%, 50%, 66% and/or the like. In various embodiments, the atomic objects in the decay manifold 230 may be allowed to spontaneously decay into the ground and/or $S_{1/2}$ manifold 210.

In various embodiments, the process of applying the first manipulation beam, pulse, and/or pulses (e.g., the first manipulation signal) to cause leaked atomic objects to transition to the intermediary manifold 240 and the applying the second manipulation beam, pulse and/or pulses (e.g., the second manipulation signal) to cause the atomic objects in the intermediary manifold 240 to transition to the decay manifold 230 may be repeated for a plurality of cycles. For example, the process may be repeated for N cycles. In an example embodiment, the number of cycles N is a set number of cycles. For example, the number of cycles N may be configured to reduce the leakage population (e.g., the population of leaked atomic objects) by a threshold factor, threshold percentage, and/or the like. In various embodiments, the leakage population is reduced by returning leaked atomic objects back to the qubit space 215. In various embodiments, the threshold factor, threshold percentage, and/or the like is selected based on time constraints, computation fidelity constraints, and/or the like.

In an example embodiment, the intermediary manifold 240 is the $D_{3/2}$ manifold. In an example embodiment, the first manipulation signal may be configured to use a quadrupole transition from the $S_{1/2}$ manifold to the $D_{3/2}$ manifold. In particular, the first manipulation signal of pulses may be configured to address leaked atomic objects (e.g., atomic objects in the F=1, m=−1 or 1, $^2S_{1/2}$ states) while not addressing atomic objects in the qubit space (e.g., atomic objects in the F=0 or 1, m=0, $^2S_{1/2}$ states). For example, the first manipulation signal may be tuned to be resonant with the $S_{1/2}|F=1\rangle$ to $D_{3/2}|F=1\rangle$ transitions. However, the hyperfine splitting in the $S_{1/2}$ and $D_{3/2}$ manifolds cause other transitions to be far off-resonance. For example, the first manipulation signal may be tuned to stimulate the transitions $S_{1/2}|F=1, m=-1\rangle$ to $D_{3/2}|F=1,m=1\rangle$ and $S_{1/2}|F=1,m=1\rangle$ to $D_{3/2}|F=1,m=-1\rangle$, while not stimulating transitions from $S_{1/2}|F=1, m=0\rangle$ or $S_{1/2}|F=0, m=0\rangle$ to the $D_{3/2}$ manifold. In various embodiments, the decay manifold 230 is the $P_{1/2}$ manifold and/or the $^3[3/2]_{1/2}$ state(s) and/or manifold.

In various embodiments, the first manipulation signal is configured to drive $|\Delta m|=2$ transitions and to suppress $|\Delta m|=0$ or 1 transitions. For example, the wave vector (e.g., k vector or direction of propagation) of the first manipulation signal and the polarization (e.g., electrical oscillations) of the first manipulation signal (e.g., when the first manipulation signal interacts with an atomic object) may be set to be orthogonal to the magnetic field at the location where the first manipulation signal interacts with an atomic object. For example, in an example embodiment, the wave vector of the first manipulation signal is in a first direction, the polarization of the first manipulation signal is in a second direction, and the magnetic field at the location of the atomic object is in a third direction. The first manipulation signal may be configured such that both the first and second directions are perpendicular to the third direction. Thus, the first manipulation signal may be used to pump leaked atomic objects to the intermediary manifold 240 while not causing atomic objects within the qubit space 215 to be pumped out of the qubit space 215.

In various embodiments, the probability of an atomic object that has been addressed by a leakage suppression/transformation cycle (e.g., pumped to the intermediary manifold 240, then pumped to the decay manifold 230, and then decaying into the ground manifold 210) of returning to the qubit space 215 is a probability of $p_q$. In various embodiments, repumping from the intermediary manifold 240 (e.g., $D_{3/2}$ manifold) to the decay manifold 230 (e.g., $P_{1/2}$ manifold) using π light (e.g., the second manipulation signal is linearly polarized parallel to the magnetic field) results in $p_q=\frac{2}{3}$. In various embodiments, repumping from the intermediary manifold 240 (e.g., $D_{3/2}$ manifold) to the decay manifold 230 (e.g., $P_{1/2}$ manifold) using σ light (e.g., the second manipulation signal is circularly polarized or linearly polarized orthogonal to the magnetic field) results in $p_q=\frac{1}{3}$. In various embodiments, using power broadening and isotropic polarization for the second manipulation signal results in $p_q \approx \frac{1}{2}$.

Assuming the first and second manipulation signals are performed with unit fidelity, the leakage population (e.g., population of leaked atomic objects) will be suppressed by $(1-p_q)^N$ where N is the number of cycles. Thus, in various embodiments, the number of cycles N is set to $$N = \left\lceil \frac{\ln \eta}{\ln 1 - p_q} \right\rceil$$

such that the leakage population is suppressed by a factor of η. In an example embodiment, η is the threshold factor specifying the targeted leakage suppression.

As noted above, the first manipulation signal is configured to drive $|\Delta m|=2$ transitions and to suppress $|\Delta m|=0$ and 1 transitions. One possible error source in this re-pumping scheme is off-resonant coupling of atomic objects within the qubit space 215 to the $D_{3/2}$, F=2 manifold. For example, it is possible that an atomic object in the qubit space 215 may be transferred to a $D_{3/2}$, F=2, m=±2 state via interaction with the first manipulation signal, which would then get repumped to the decay manifold 230 and turn into a leakage error with some probability $p_r$. The probability of this occurring on a single cycle would be approximately equal to $p_r(\Omega_{(1,0),(2,2)}/\Delta_{hf})^2$ where $\Omega_{(1,0),(2,2)}$ is the resonant Rabi frequency for the $S_{1/2}$, F=1, m=0↔$D_{3/2}$, F=2, m=±2 transition, and $\Delta_{hf}$ is the detuning which would be equal to the hyperfine splitting in the $D_{3/2}$ state. Since this leakage error also gets suppressed during subsequent cycles the total leakage error from this process would be $$\sum_{n=1}^{N} p_r \left(\frac{\Omega_{(1,0),(2,2)}}{\Delta_{hf}}\right)^2 (1-p_q)^{N-n} = p_r \left(\frac{\Omega_{(1,0),(2,2)}}{\Delta_{hf}}\right)^2 \frac{1-(1-p_q)^N}{p_q},$$

which is the quantity that should be kept below the target leakage error, $\epsilon_l^{(f)}$. Based on the quadrupole Rabi frequency Ω and using $\Omega\tau_\pi=\pi$ for the definition of pulse time $\tau_\pi$ gives the following approximate upper limit on the first pulse time to maintain the target leakage error below $$\epsilon_l^{(f)} : \tau_\pi > \frac{2\sqrt{2}\pi}{3\Delta_{hf}} \sqrt{\frac{p_r}{\epsilon_l^{(f)} p_q}(1-(1-p_q)^n)},$$

wherein the first pulse time is the temporal length of a pulse of the first manipulation signal.

Another source of error would stem from imperfect alignment between the magnetic field and the polarization and wave vectors of the first manipulation signal. This puts another constraint on the first pulse time, $$\tau_\pi > \frac{\beta\pi}{\Delta_Z} \sqrt{\frac{p_r}{\epsilon_l^{(f)} p_q}(1-(1-p_q)^n)},$$

where $\beta$ is a suppression factor by which the Rabi frequency is suppressed due to the imperfect alignment between the magnetic field and the polarization and wave vectors of the first manipulation signal and $\Delta_z$ is the Zeeman energy splitting in the manifolds of interest. For small angle errors, the suppression factor is $$\beta = \left(\frac{2}{3}\right)^{3/2} (\gamma - \pi/2),$$

where $\gamma$ is the angle between the magnetic field and the polarization. Putting the two constraints on the first pulse time together can be written as $$\tau_\pi > \max\left[\left(\frac{2}{3}\right)^{3/2} \frac{\left(\gamma - \frac{\pi}{2}\right)}{\Delta_Z}, \frac{2\sqrt{2}}{3\Delta_{hf}}\right] \sqrt{\frac{\pi^2 p_r}{\epsilon_l^{(f)} p_q}(1-(1-p_q)^n)}$$

By equating these two limits, how small of an angle error that can be tolerated without sacrificing any speed may be determined, $$\left|\gamma - \frac{\pi}{2}\right| < \frac{2\sqrt{3}\,(1.4\text{ MHz}/G)B}{\Delta_{hf}}.$$

For example, the $D_{3/2}$ hyperfine splittings in $^{133}$Ba+ and $^{171}$Yb+ are 937 MHz and 860 MHz respectively, giving angle error tolerances of 26 mrad and 28 mrad assuming a nominal magnetic field (e.g., B field) of 5 gauss.

Starting with a leakage error of $\epsilon_l^{(0)}$, after N cycles, the final leakage error $\epsilon_l^{(f)}$ is the sum of the suppressed initial leakage error and the leakage error induced through off-resonant coupling or $$\epsilon_l^{(f)} = (1-p_q)^n \epsilon_l^{(0)} + \frac{8\pi}{9} \frac{n^2 p_r}{(T\Delta_{hf})^2} \frac{1-(1-p_q)^n}{p_q},$$

where $T=N\tau_\pi$ is the total time used to perform the leakage suppression/transformation operation (where it is assumed that the repump step (e.g., providing the second manipulation signal and allowing for the decay of atomic objects from the decay manifold 230 to the $S_{1/2}$ or ground state manifold 210) is a negligible contribution to the total time for the entire operation).

FIG. 3A provides a plot showing simulation results of the final leakage error E as a function of the total time used to perform the leakage suppression/transformation operation and FIG. 3B provides a plot showing simulation results of the final leakage error $\epsilon_l^{(f)}$ as a function of the number of cycles N. In the simulation, $p_q=p_r=\frac{1}{2}$, $\epsilon_l^{(0)}=10^{-4}$ and $\Delta_{hf}/2\pi=860$ MHz. The results shown in FIGS. 3A and 3B show that the leakage error can be suppressed from $10^{-4}$ to $10^{-7}$ in approximately T=25 μs, with approximately 1 μs first pulse times. In various embodiments, the total time used to perform the leakage suppression/transformation operation T is less than approximately 50 μs. In various embodiments, the total time to perform the leakage suppression/transformation operation T is less than approximately 30 μs. In various embodiments, the first pulse times are in the range of approximately 0.5 to 3 μs.

Using the expression for the Rabi frequency, the required laser power for example embodiments of the leakage suppression/transformation operation is estimated. In an example embodiment, with a 15 μm beam waist, for $^{133}$Ba+ atomic objects (e.g., ions), the first manipulation signal may have a power of at least 100 mW to achieve a 1 μs first pulse time. In an example embodiment, with a 15 μm beam waist, for $^{171}$Yb+ atomic objects (e.g., ions), the first manipulation signal may have a power of at least 7.4 mW to achieve a 1 μs first pulse time.

As noted above, in the simulation results, the magnetic field is taken as 5 gauss. However, using a larger magnetic field would cause further Zeeman splitting which would increase the spectral isolation of the target transitions and might alleviate the need for suppression of $\Delta m=\pm 1$ and $\Delta m=0$ transitions via selection rules and extend the protocol to atomic objects of higher nuclear spin. In an example embodiment, the magnetic field is approximately 5 gauss. However, in various embodiments, the magnetic field may be more or less than 5 gauss, as appropriate for the application. For example, in an example embodiment, a high magnetic field (e.g., a magnetic field that is greater than 3 gauss or greater than 5 gauss, in various embodiments) may be used to increase the detunings for unwanted transitions (e.g., transitions that would excite atomic objects out of the qubit space).

In various embodiments, one or more pulse shaping techniques may be used to shape the pulse of the first manipulation signal. In an example embodiment, the first manipulation signal is shaped to be a hyperbolic secant shaped pulse having, for example a first pulse time in the range of approximately 30 μs and 0.8 μs-. In various embodiments, the first manipulation signal may be shaped to reduce transitions of qubits within the qubit space 215 to the intermediary manifold 240 and/or out of the qubit space 215 responsive to the first manipulation signal.

In various embodiments, the first and/or second manipulation sources may cause atomic objects within the qubit space 215 and/or atomic objects returned to the qubit space to experience a Stark shift. In various embodiments, the controller 30 and/or computing entity 10 may apply one or more Z rotations to the qubit (e.g., physically and/or during post-processing of results generated by the quantum computer 110) to compensate for this shift.

Exemplary Operation of a Leakage Suppression/Transformation Operation

FIG. 4 provides a flowchart illustrating processes, procedures, operations, and/or the like performed to suppress leakage errors and return atomic objects back into the qubit space 215. For example, the leakage errors may be transformed into standard quantum computing errors that are addressable and/or correctable. For example, the standard quantum computing errors may be addressable and/or correctable via quantum error correction. In various embodiments, a quantum computer 110 may comprise a plurality of atomic objects (e.g., trapped within an apparatus 50). The hyperfine levels of the atomic objects may be used define a qubit space 215. For example, the atomic objects may be nuclear-spin ½ atomic objects and the hyperfine structure of the ground state (e.g., the $^2S_{1/2}$ manifold) may be used to define a qubit space 215 (e.g., comprising the F=0 and 1, m=0, $^2S_{1/2}$ states). In various scenarios, an atomic object may leak out of the qubit space 215. For example, an atomic object may experience a spontaneous emission event or other excitation event and end up in a leaked state (e.g., one of the F=1, m=−1 or 1, $^2S_{1/2}$ states). A leakage suppression/transformation operation may be used to return the atomic objects from the leaked states back to the qubit space 215.

Starting at step/operation 402, a leakage suppression/transformation operation trigger is identified. In various embodiments, the trigger is the performance of a computing operation, performance of a computing operation of a particular type, a set amount of time elapsing since a leakage suppression/transformation operation was last performed, and/or the like. For example, the types of computing operations may include gate operations, cooling operations, transport operations, qubit interaction operations, qubit measurement operations, and/or the like. For example, the controller 30 may schedule one or more computing operations based on a received quantum algorithm or quantum circuit (e.g., provided by a computing entity 10). Based on the scheduling of an operation that is identified as a trigger, the controller 30 may schedule the performance of a leakage suppression/transformation operation. For example, the scheduling and/or performance of a gate operation in a particular region of the apparatus 50, in accordance with a quantum algorithm and/or quantum circuit being and/or to be performed by the quantum computer 110) may be identified as a trigger. Responsive to identifying the scheduling and/or performance of the gate operation in the particular region of the apparatus 50, the controller 30 may schedule and/or perform a leakage suppression/transformation operation to be performed in the particular region of the apparatus 50. For example, the operation that triggered the scheduling/performance of the leakage suppression/transformation operation may address one or more atomic objects located in the particular region of the apparatus 50 and the leakage suppression/transformation operation may be configured to address the one or more atomic objects located in the particular region of the apparatus 50.

In an example embodiment, the computing entity 10 may provide a quantum algorithm and/or quantum circuit. The controller 30 may receive the quantum algorithm and/or quantum circuit and schedule and/or perform one or more operations (e.g., computing operations such as gate operations, cooling operations, transport operations, qubit interaction operations, qubit measurement operations; leakage suppression/transformation operations; and/or the like). In an example embodiment, the quantum algorithm and/or quantum circuit may indicate when a leakage suppression/transformation operation is to be performed. In an example embodiment, the controller 30 may determine when to perform a leakage suppression/transformation operation based on the computing operations of the quantum algorithm and/or quantum circuit.

At step/operation 404, the leakage suppression/transformation operation may be initiated. For example, controller 30 may initiate the leakage suppression/transformation operation. For example, responsive to identifying the trigger, the controller 30 may schedule the performance of a leakage suppression/transformation operation and/or cause a leakage suppression/transformation operation to be performed (e.g., at a particular time and/or in a particular position in a sequence of operations performed by the quantum computer 110). When the controller 30 executes the commands to cause the performance (e.g., at the scheduled time) of the leakage suppression/transformation operation, the controller may cause the cycle number n to be set to zero (e.g., set n=0), cause the first and/or second manipulation sources 64A, 64B to be turned on or warmed up, access one or more parameters corresponding to the leakage suppression/transformation operation (e.g., first pulse time, second pulse time, first manipulation signal power, second manipulation signal power, number of cycles N, total time of the leakage suppression/transformation operation T, decay time, and/or other parameters) from memory (e.g., memory 610), and/or the like.

At step/operation 406, the controller 30 causes the first manipulation source 64A to provide a first manipulation signal to the particular region of the apparatus 50. For example, the controller 30 may cause a first manipulation source 64A to provide a first manipulation signal that is incident on one or more atomic objects within the particular region of the apparatus 50 and that addresses any leaked atomic object(s) in the particular region of the apparatus 50. In an example embodiment, the first manipulation source 64A is a laser. The first manipulation signal may be configured to address the leaked atomic objects (e.g., atomic objects in the leaked states of F=1, m=−1 or 1, $^2S_{1/2}$ states) while not addressing atomic objects in the qubit space (e.g., atomic objects in the F=0 or 1, m=0, $^2S_{1/2}$ states). For example, the first manipulation signal may be configured to excite a quadrupole transition from the leaked states. For example, the first manipulation signal may be tuned to be resonant with transitions from the leaked states (e.g., F=1, m=−1 or 1, $^2S_{1/2}$ states) to an intermediary manifold 240. In various embodiments, the intermediary manifold 240 is the $D_{3/2}$ manifold. In various embodiments, the first manipulation signal may be tuned to be off-resonance for transitions originating from within the qubit space 215 (e.g., F=0 or 1, m=0, $^2S_{1/2}$ states). For example, leaked atomic objects may be transitioned from the leaked states to states of an intermediary manifold 240 (e.g., possibly using a quadrupole transition) via the first manipulation signal and atomic objects within the qubit space 215 may be generally unaffected (and/or minimally affected) by the first manipulation signal. For example, the first manipulation signal may be tuned to stimulate the transitions $S_{1/2}|F=1,m=-1\rangle$ to $D_{3/2}|F=1,m=1\rangle$ and $S_{1/2}|F=1,m=1\rangle$ to $D_{3/2}|F=1,m=-1\rangle$, while not stimulating transitions from $S_{1/2}|F=1, m=0\rangle$ or $S_{1/2}|F=0, m=0\rangle$ states to the $D_{3/2}$ manifold.

In various embodiments, the wave vector of the first manipulation signal is in a first direction, the polarization of the first manipulation signal is in a second direction, and the magnetic field in the particular region of the apparatus 50 is in a third direction. In various embodiments, the first direction and the second direction are approximately orthogonal to the third direction. For example, the wave vector and the polarization of the first manipulation signal may be tailored to excite wanted transitions and suppress unwanted transitions. In various embodiments, the first manipulation signal is shaped (e.g., by a pulse shaper in the optical path between the first manipulation source 64A and the particular region of the apparatus 50) to have a shape that suppresses transitions out of the qubit space 215. For example, the first manipulation signal may be shaped to have a hyperbolic secant shape.

In various embodiments, the first pulse time (e.g., the temporal length of the first manipulation signal) is in the range of approximately 30 µs and 0.8 µs. For example, the first pulse time may be approximately 1 µs, in various embodiments. In various embodiments the first manipulation signal may be in the range of approximately 0.1 to 500 mW. For example, in an example embodiment, the first manipulation signal has a 15 µm beam waist and a power in the range of approximately 5 to 200 mW. FIG. 5A provides a schematic illustration of applying the first manipulation signal to the atomic objects in the particular region of the apparatus 50. For example, as shown in FIG. 5A, an atomic object in a leaked state (e.g., F=1, m=−1 or 1, $^2S_{1/2}$) to states of an intermediary manifold 240 (e.g., F=1, m=1 or −1, $^2D_{3/2}$).

Continuing with FIG. 4, to step/operation 408, the controller 30 causes the second manipulation source 64B to provide a second manipulation signal to re-pump the leaked atomic objects from the intermediary manifold 240 to the decay manifold 230. For example, the controller 30 may cause the second manipulation source 64B to provide a second manipulation signal to the particular region of the apparatus 50. The second manipulation signal may be tuned to excite transitions from the intermediary manifold 240 to the decay manifold 230. In various embodiments, the second manipulation signal is far off resonance from transitions out of the qubit space 215. In various embodiments, the decay manifold 230 is the $P_{1/2}$ manifold and/or the $^3[3/2]_{1/2}$ state(s) and/or manifold. In various embodiments, the second pulse time (e.g., the temporal length of the second manipulation signal) is in the range of approximately 30 µs and 0.8 µs. For example, the second pulse time may be approximately 1 µs, in various embodiments.

FIG. 5B provides a schematic illustration of applying the second manipulation signal to the atomic objects in the particular region of the apparatus 50. For example, as shown in FIG. 5B, atomic objects in states of the intermediary manifold 240 may be excited and/or transition to states of the decay manifold 230, where the decay manifold 230 is the $^2P_{1/2}$ manifold. FIG. 5D provides a schematic illustration of the second manipulation signal causing atomic objects to be excited and/or transition from states of the intermediary manifold 240 to one of the states of the decay manifold 230, where the decay manifold is the $^3[3/2]_{1/2}$ manifold.

Continuing with FIG. 4, at step/operation 410, the atomic objects in the decay manifold 230 are allowed to decay into the ground manifold 210. For example, the controller 30 waits a decay time to allow atomic objects in the decay manifold 230 to decay into the ground manifold 210. In various embodiments, the decay time is predetermined based on the finite lifetime of the excited states of the decay manifold 230. FIG. 5C provides a schematic illustration of atomic objects decaying from one of the states of the decay manifold 230 into the ground manifold 210. As can be seen in FIG. 5C, when an atomic object decays from the decay manifold 230 into the ground state manifold 210, the atomic object will decay into the qubit space 215 with a particular likelihood (e.g., $p_q$) and will decay into a leaked state with a complimentary likelihood (e.g., $1-p_q$). FIG. 5D provides a schematic illustration of an atomic objects decaying from one of the states of the decay manifold 230 into the ground manifold, where the decay manifold is the $^3[3/2]_{1/2}$ manifold.

In various embodiments, the controller 30 may cause a plurality of pumping cycles to be performed. In various embodiments, a cycle may comprise applying the first manipulation signal to the particular region of the apparatus 50, applying the second manipulation signal to the particular region of the apparatus 50, and waiting a decay time to allow the atomic objects in the decay manifold 230 to decay back to the ground state manifold 210. In various embodiments, there is a chance that the atomic objects that decay from the decay manifold 230 will decay into the qubit space 215 defined in the ground state manifold 210 during each cycle. In the next cycle, there will be a smaller probability of any atomic objects being in the leaked states to be excited by the first manipulation signal. In this manner, with each cycle, the leaked population of atomic objects is reduced. After performance of a number of cycles N, a threshold factor, threshold percentage, and/or the like of the leaked atomic objects are returned back to the qubit space 215. In various embodiments, the cycle time t (e.g., amount of time required to perform a cycle of the leakage suppression/transformation operation) is the sum of the first pulse time, the second pulse time, and the decay time. For example, in an example embodiment, the total time used to perform the leakage suppression/transformation operation T is the product of the number of cycles N and the cycle time t (e.g., which approximately equals the sum of the first pulse time, the second pulse time, and the decay time).

Returning to FIG. 4, at step/operation 412, the controller 30 iterates the cycle number n. For example, the controller 30 may iterate the cycle number n such that the n→n+1. For example, the controller 30 may use the cycle number n to track the number of cycles that have been performed and the controller 30 may iterate the cycle number n after performance of a cycle.

At step/operation 414, the controller 30 determines if the cycle number n is equal to the number of cycles N. For example, the controller 30 may be configured and/or programmed to execute the number of cycles N of the leakage operation (e.g., application of the first manipulation signal, application of the second manipulation signal, waiting the decay time). The controller 30 may use the cycle number n to determine if the number of cycles N have been performed. In an example embodiment, the iteration of the cycle number n and the determination of whether the cycle number n equals the number of cycles N may be performed while the controller 30 is waiting the decay time.

When, at step/operation 414, the controller 30 determines that the cycle number n does not equal the number of cycles N (e.g., n<N), the process returns to step/operation 406 and another cycle may be performed. When, at step/operation 414, the controller 30 determines that the cycle number n does equal the number of cycles (e.g., n=N), the process continues to step/operation 416. At step/operation 416, the controller 30 determines that the leakage suppression operation/transformation has been completed. For example, the controller 30 may update a log (e.g., stored in memory 610) to indicate that the leakage suppression/transformation operation has been completed, execute a next command to cause a next operation to be performed, and/or the like.

Technical Advantages

In various embodiments, a two-state qubit space 215 is defined. In various embodiments, a qubit is an atomic object contained, trapped, and/or otherwise within an apparatus 50 of a quantum computer 110. The atomic object contained, trapped, and/or otherwise within the apparatus 50 may have access to more states than those of the qubit space 215. For example, in the illustrated embodiments of FIGS. 5A-5D, when the atomic object is a nuclear-spin ½ atomic object, the ground state manifold 210 of the atomic object may comprise four states (e.g., two states in the qubit space 215 and two leaked states). Thus, as the quantum computer 110 executes various operations, one or more atomic objects trapped in the apparatus 50 may be leaked into a leaked state. The leakage of atomic objects into leaked states results in errors in the computations performed by the quantum computer 110. By performing a leakage suppression/transformation operation, in accordance with various embodiments, the final leakage error may be reduced by several orders of magnitude (e.g., with respect to not performing a leakage suppression/transformation operation). For example, FIGS. 3A-3C illustrate that the final leakage error may be reduced to be on the order of $10^4$ with a total time used to perform the leakage suppression/transformation operation T of 20-25 µs or a number of cycles N≥10. Thus, a leakage suppression/transformation operation in accordance with an example embodiment provides a means for quantum error correction to improve the fidelity of computations performed by the quantum computer 110. For example, by returning leaked atomic objects to the qubit space 215, various embodiments enables quantum error correction procedures to be more effective in improving the fidelity of computation performed by the quantum computer 110. Various embodiments therefore provide an improvement to the field of quantum computing by improving the functioning of a trapped atomic object quantum computer 110.

Exemplary Controller

In various embodiments, a quantum computer 110 further comprises a controller 30 configured to control various elements of the quantum computer 110. In various embodiments, a controller 30 may be configured to cause a quantum computer 110 to perform various operations (e.g., computing operations such as gate operations, cooling operations, transport operations, qubit interaction operations, qubit measurement operations; leakage suppression/transformation operations; and/or the like). For example, the controller 30 may be configured to identify a trigger, schedule a leakage suppression/transformation operation and/or cause a leakage suppression/transformation operation to be performed, control first and/or second manipulation sources to provide first and/or second manipulation signals, and/or the like. For example, the controller 30 may be configured to control a cryogenic system and/or vacuum system controlling the temperature and pressure within the cryogenic and/or vacuum chamber 40, manipulation sources 64, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the apparatus 50.

As shown in FIG. 6, in various embodiments, the controller 30 may comprise various controller elements including processing elements 605, memory 610, driver controller elements 615, a communication interface 620, analog-digital converter elements 625, and/or the like. For example, the processing elements 605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 605 of the controller 30 comprises a clock and/or is in communication with a clock.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding to the qubits of the quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 610 (e.g., by a processing element 605) causes the controller 30 to perform one or more steps, operations, processes, procedures and/or the like described herein.

In various embodiments, the driver controller elements 615 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 605). In various embodiments, the driver controller elements 615 may enable the controller 30 to operate a manipulation sources 64, operate vacuum and/or cryogenic systems, and/or the like. In various embodiments, the drivers may be laser drivers; vacuum component drivers; cryogenic and/or vacuum system component drivers; and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 625 configured to receive signals from one or more optical receiver components, calibration sensors, and/or the like.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 7 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110. For example, a user may operate a computing entity 10 to generate and/or program a quantum algorithm and/or quantum circuit that may be provided such that the controller 30 may receive the quantum algorithm and/or quantum circuit and cause the quantum computer 110 to perform the quantum algorithm and/or quantum circuit.

As shown in FIG. 7, a computing entity 10 can include an antenna 712, a transmitter 714 (e.g., radio), a receiver 706 (e.g., radio), and a processing element 708 that provides signals to and receives signals from the transmitter 714 and receiver 706, respectively. The signals provided to and received from the transmitter 714 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 716 and/or speaker/speaker driver coupled to a processing element 708 and a touch screen, keyboard, mouse, and/or microphone coupled to a processing element 708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A quantum computer comprising:
an apparatus having one or more atomic objects therein;

a first manipulation source configured to provide a first manipulation signal;

a second manipulation source configured to provide a second manipulation signal; and a controller, the controller configured to:

cause the first manipulation source to provide the first manipulation signal to a particular region of the apparatus, wherein the first manipulation signal is tuned to excite atomic objects within the particular region of the apparatus that have leaked out of a qubit space from a leaked state to an intermediary manifold and to suppress excitation of atomic objects that are in the qubit space; and cause the second manipulation source to provide the second manipulation signal to the particular region of the apparatus, wherein (a) the second manipulation signal is tuned to excite atomic objects from the intermediary manifold to a decay manifold and (b) there is a non-zero probability that an atomic object will decay from the decay manifold into the qubit space.

2. The quantum computer of claim 1, wherein the controller is configured to cause the first and second manipulation sources to sequentially provide the first and second manipulation signals a plurality of times to achieve a desired leakage suppression factor, wherein after the second manipulation source provides the second manipulation signal, the controller causes the first manipulation source to provide another first manipulation signal after a decay time.

3. The quantum computer of claim 2, wherein the decay time is determined based on a time for an atomic object to decay from the decay manifold to a ground state manifold, the qubit space being defined within the ground state manifold.

4. The quantum computer of claim 1, wherein the qubit space is defined based on hyperfine structure of a ground state manifold of the one or more atomic objects.

5. The quantum computer of claim 1, wherein the first manipulation signal is shaped to suppress transitions out of the qubit space.

6. The quantum computer of claim 1, wherein the first manipulation signal is tuned to excite a quadrupole transition from the leaked state to the intermediary manifold.

7. The quantum computer of claim 1, wherein excitation of atomic objects that are within the qubit space is suppressed by high magnetic fields which cause large energy detunings for unwanted transitions.

8. The quantum computer of claim 1, wherein the wave vector and polarization of the first manipulation signal are arranged to minimize excitations of atomic objects out of the qubit space.

9. The quantum computer of claim 1, wherein (a) the one or more atomic objects are nuclear-spin ½ atomic objects, (b) the intermediary manifold is a $^2D_{3/2}$ manifold, and (c) the decay manifold is one of a $^2P_{1/2}$ manifold or a $^3[3/2]_{1/2}$ manifold.

10. The quantum computer of claim 1, wherein a wave vector and a polarization of the first manipulation signal are substantially orthogonal to a magnetic field in the particular region of the apparatus.

11. A method for suppressing/transforming leakage error in a quantum computer, the method comprising:

causing, by a controller of the quantum computer, a first manipulation source to provide a first manipulation signal to a particular region of an apparatus of the quantum computer having one or more atomic objects therein, wherein the first manipulation signal is tuned to excite the one or more atomic objects within the particular region of the apparatus that have leaked out of a qubit space from a leaked state to an intermediary manifold and to suppress excitation of atomic objects within the particular region of the apparatus that are in the qubit space; and causing, by the controller, a second manipulation source to provide a second manipulation signal to the particular region of the apparatus, wherein (a) the second manipulation signal is tuned to excite atomic objects from the intermediary manifold to a decay manifold and (b) there is a non-zero probability that an atomic object will decay from the decay manifold into the qubit space.

12. The method of claim 11, further comprising causing, by the controller, the first and second manipulation sources to sequentially provide the first and second manipulation signals a plurality of times to achieve a desired leakage suppression factor, wherein after the second manipulation source provides the second manipulation signal, the controller causes the first manipulation source to provide another first manipulation signal after a decay time.

13. The method of claim 12, wherein the decay time is determined based on an average time for an atomic object to decay from the decay manifold to a ground state manifold, the qubit space being defined within the ground state manifold.

14. The method of claim 11, wherein the qubit space is defined based on hyperfine structure of a ground state manifold of the one or more atomic objects.

15. The method of claim 11, wherein the first manipulation signal is shaped to suppress transitions out of the qubit space.

16. The method of claim 11, wherein the first manipulation signal is tuned to excite a quadrupole transition from the leaked state to the intermediary manifold.

17. The method of claim 11, wherein excitation of atomic objects that are within the qubit space is suppressed by high magnetic fields which cause large energy detunings for unwanted transitions.

18. The method of claim 11, wherein the wave vector and polarization of the first manipulation signal are arranged to minimize excitations of atomic objects in the qubit space.

19. The method of claim 11, wherein (a) the one or more atomic objects are nuclear-spin ½ atomic objects, (b) the intermediary manifold is a $^2D_{3/2}$ manifold, and (c) the decay manifold is one of a $^2P_{1/2}$ manifold or a $^3[3/2]_{1/2}$ manifold.

20. The method of claim 11, wherein a wave vector and a polarization of the first manipulation signal are substantially orthogonal to a magnetic field in the particular region of the apparatus.

* * * * *